Dec. 10, 1935.  T. B. BUELL  2,023,869
WORK SUPPORTS FOR MACHINE TOOLS
Filed Nov. 22, 1933
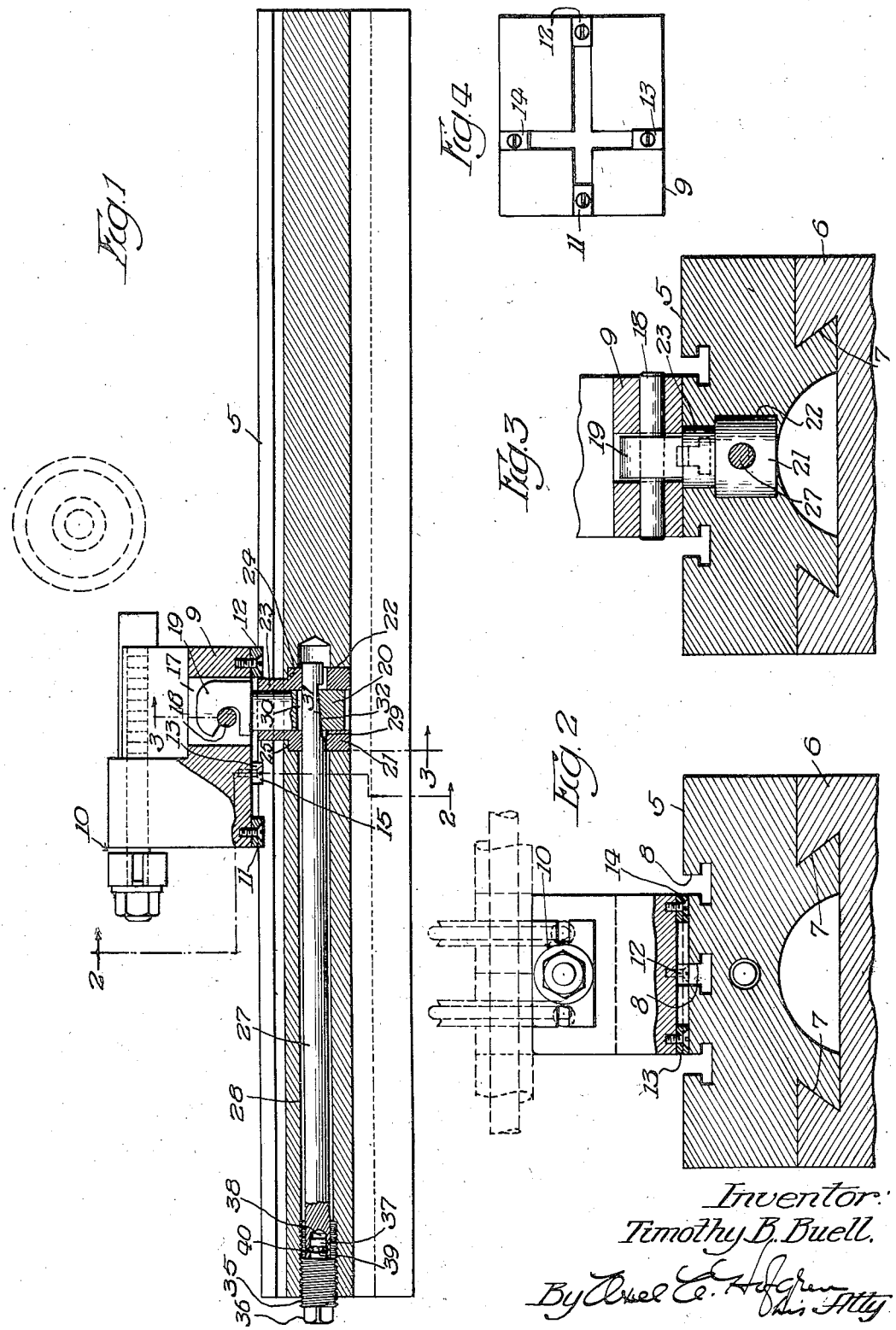
Inventor:
Timothy B. Buell,
By Axel E. Hofgren
his Atty Patented Dec. 10, 1935

2,023,869

UNITED STATES PATENT OFFICE 2,023,869

WORK SUPPORTS FOR MACHINE TOOLS

Timothy B. Buell, Rockford, Ill., assignor to Sundstrand Machine Tool Co., Rockford, Ill., a corporation of Illinois Application November 22, 1933, Serial No. 699,210

4 Claims. (Cl. 90—59)

This invention relates generally to work supports for milling machines and other machine tools, and more particularly to a work support embodying a new and improved fixture clamping mechanism.

In mounting work pieces on the work supports or tables of milling and other types of machines, it is generally customary to mount the piece in a fixture or work holder rather than to clamp it directly to the table by means of bolts secured in inverted T-slots. This practice is customary particularly when the work pieces are relatively small or when they are of such shapes that fixtures with special clamping jaws or means are necessary for the purpose of securely holding the work in its proper position during the cutting operation. Such fixtures are often provided with quickly operable clamping devices so as to facilitate the removal of finished work pieces and the mounting of work blanks.

It has been found that there are numerous instances in which it is desirable and even necessary to change the work holder fixture itself quite frequently. Generally the fixtures are secured to the table by means of bolts in inverted T-slots or some other rather permanent manner, so that the removal of one fixture and the substitution of another requires an appreciable amount of time. It is the general object of this invention to provide a work supporting structure embodying a table or support and a detachable work fixture or holder, together with new and improved means for securing the work fixture or holder detachably to the table in such a manner that the parts are rigidly attached during the cutting operation, but may be quickly separated and the fixture removed from the table for the purpose of substituting another fixture which may be required for holding other types or sizes of work pieces.

Another object is to provide a novel fixture clamping mechanism which can readily be installed on existing work tables and fixtures with a minimum amount of machining.

Another object is to provide a work supporting means embodying a table and a fixture and a novel fixture clamping mechanism together with means for properly positioning or alining the fixture on the table.

Further objects and advantages will become readily apparent from the following detailed description taken in connection with the accompanying drawing, in which:

Fig. 1 is a longitudinal central section through a milling machine table, illustrating a preferred form of the invention.

Fig. 2 is a view looking at the left hand end of Fig. 1, and partly in section, along the line 2—2 of Fig. 1.

Fig. 3 is a fragmentary section along the line 3—3 of Fig. 1.

Fig. 4 is a view looking at the bottom of the work fixture.

Although I have illustrated in the drawing and shall herein describe in detail a prefererd form of the invention as embodied in a work support for a milling machine, it is with the understanding that I do not thereby intend to limit the invention to the specific form or arrangement shown, but aim to cover all modifications and alternative constructions falling within the spirit and scope of the invention as expressed in the appended claims.

In the drawing, 5 represents the table of a milling machine slidably mounted on a bed 6 and guided thereon along ways 7. This table is provided with the usual longitudinally extending inverted T-slots 8 for the reception of clamping bolts for the work or work fixtures.

A work fixture is herein illustrated at 9 and since the specific work clamping means on the fixture may be of any preferred or desired form they are indicated generally at 10. The fixture is herein shown in the form of a somewhat rectangular metal block and is preferably provided with positioning means in the shape of keys 11, 12, 13 and 14 which are arranged to engage in slots in the surface of the table for locating the fixture on the table. Thus the keys 11 and 12 engage in the central T-slot 8 and the keys 13 and 14 engage in transversely extending slots or recesses 15 cut across the central portion of the top of the table. The fixture has a vertically positioned opening 17 across which a pin 18 extends. This pin forms a part of the means for clamping the fixture to the table and to that end is axially removable and is arranged to be engaged by means of a hook-like member 19 which has a cylindrical portion 20 slidable vertically in a bushing 21 mounted in a recess 22 in the table. The bushing 21 is preferably provided with a reduced portion 23 so as to form a shoulder 24 engaging an abutment 25 on the table so as to prevent movement of the bushing upwardly in the table during the clamping operation.

As illustrated herein the means for raising and lowering the clamping member 19 is shown as comprising a bar or rod 27 positioned in a longitudinally extending bore 28 in the table 5 and extending through openings 29 and 30 in the bushing 21 and the cylindrical portion 20 of the clamping member respectively. The rod 27 is provided with an inclined or cam surface 31 arranged to cooperate with a corresponding cam surface 32 on the clamping member 19, so that when the rod 27 is moved toward the right (Fig. 1) the clamping member 19 will be drawn downwardly to secure the fixture 9 rigidly to the table whereas when the rod 27 is moved toward the left the clamping member will be released. With the clamping member released the pin 18 may be withdrawn axially, thereby freeing the fixture for removal by simply lifting the same vertically off of the table. In the preferred form of the invention the rod 27 is arranged to be actuated by means of a screw device 35 which is threaded into the outer end of the bore 28 in the table 5, and is provided with a squared end 36 for the reception of a suitable tool. This screw device has a reduced portion 37 extending into a socket 38 in the adjacent end of the rod 27, and has a peripheral groove 39. A pair of pins 40, extending in laterally spaced relation through the rod 27, engage in the groove 39 so that when the screw device 35 is turned the rod 27 will be moved longitudinally without being rotated. Preferably, as illustrated in Fig. 1, the end of the rod 27 abuts the large portion of the screw device 35 during the clamping operation. Thus the pin connection need only be sufficiently strong to withdraw the rod 27 when the clamping member is loosened.

It will be readily apparent that the invention not only provides a readily operable mechanism for quickly clamping a work fixture to a table, but also provides means for properly positioning and alining the fixture on the table. Thus fixtures having differently shaped or constructed clamping means may be provided with similarly positioned keys 11, 12, 13 and 14, and pins 18 so as to permit one fixture to be readily substituted for another. The clamping mechanism may be readily applied to the table of an existing machine merely by drilling the necessary vertical holes for the bushing 21, and the longitudinally extending bore 28 for the operating rod 27. Since the lugs 11 and 12 may fit into the central T-slot ordinarily found on a table, it is only necessary to add the cross slots. By positioning the pin 18 in the forward portion of the fixture or immediately adjacent the work holding portion thereof a rigid connection between the fixture and table is secured immediately adjacent the work.

I claim as my invention:

1. Work supporting means for a machine comprising, in combination, a table having respectively perpendicular recesses in its upper surface, a removable work fixture adapted to be mounted on the table having locating keys adapted to engage in said recesses for definitely positioning said fixture both laterally and longitudinally of the table, and means for securing said fixture to the table comprising a vertically slidable clamping member in the table having means adapted to engage said work fixture, cam means interposed between said table and said clamping member for actuating the latter, and screw means for actuating said cam means to loosen or tighten said clamping member.

2. Work supporting means for a machine comprising, in combination, a table, a work fixture adapted to be removably mounted on the table, said fixture having a central recess, and means for securing said fixture to the table for vertical removal comprising a pin extending transversely across the recess in said fixture and axially removable, a vertically slidable clamping member in the table having a portion projecting above the surface of the table and received in the recess in said fixture when the same is placed on the table, said portion having an aperture through which said pin projects, and cam means for drawing said clamping member downwardly thereby to secure said pin against axial movement and said fixture against removal.

3. Work supporting means for a machine comprising, in combination, a table having respectively perpendicular recesses in its upper surface, a removable work fixture adapted to be mounted on the table having locating keys adapted to engage in said recesses for definitely positioning said fixture both laterally and longitudinally of the table, said fixture also having a central recess, a vertically slidable clamping member in the table having a portion projecting above the upper surface of the table and received in the recess in said fixture when the same is placed on the table, said clamping member having an aperture in the portion projecting into said fixture and a cam slot in its other end, a pin projecting transversely of the recess of said fixture and through the aperture in said clamping member, said pin being axially removable when the clamping member is released to permit vertical removal of said fixture, and cam means engaging said cam slot and operable to draw said member downwardly to secure said pin and said fixture against removal.

4. Work supporting means for a machine comprising, in combination, a table having respectively perpendicular recesses in its upper surface, a removable work fixture adapted to be mounted on the table having locating keys adapted to engage in said recesses for definitely positioning said fixture both laterally and longitudinally of the table, a vertically slidable clamping member in the table projecting above the table for engagement with said fixture, cam means for actuating said clamping member, and means carried by said fixture engaged by said clamping member when in clamping position to secure said fixture and wholly disengageable from said member when in released position to permit vertical removal of said fixture.

TIMOTHY B. BUELL.